(12) United States Patent
Zaitsu

(10) Patent No.: US 6,535,407 B1
(45) Date of Patent: Mar. 18, 2003

(54) DC/DC CONVERTER HAVING A PIEZOELECTRIC TRANSFORMER AND RECTIFICATION-SMOOTHING CIRCUIT

(75) Inventor: Toshiyuki Zaitsu, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/123,522

(22) Filed: Jul. 28, 1998

(30) Foreign Application Priority Data

Jul. 31, 1997 (JP) .............................................. 9-205719

(51) Int. Cl.[7] ........................ H02M 7/06; H02M 3/335; H02M 1/12
(52) U.S. Cl. ........................... 363/126; 363/17; 363/19; 363/47
(58) Field of Search ............................. 363/17, 19, 98, 363/126, 132, 45, 46, 47

(56) References Cited

U.S. PATENT DOCUMENTS

| | | | | |
|---|---|---|---|---|
| 4,899,271 A | * | 2/1990 | Seiersen | 363/126 |
| 5,274,543 A | * | 12/1993 | Loftus, Jr. | 363/127 |
| 5,353,212 A | * | 10/1994 | Loftus, Jr. | 363/17 |
| 5,459,650 A | * | 10/1995 | Noro | 363/24 |
| 5,663,876 A | * | 9/1997 | Newton et al. | 363/126 |
| 5,675,484 A | * | 10/1997 | Shimada | 363/71 |
| 5,739,622 A | * | 4/1998 | Zaitsu | 363/97 |
| 5,768,111 A | * | 6/1998 | Zaitsu | 363/95 |
| 5,784,266 A | * | 7/1998 | Chen | 363/17 |

FOREIGN PATENT DOCUMENTS

| | | | |
|---|---|---|---|
| JP | 61-24913 | 6/1986 | H02M/3/28 |
| JP | 5-284734 | 10/1993 | H02M/3/155 |
| JP | 7-59338 | 3/1995 | H02M/3/24 |

OTHER PUBLICATIONS

Zaitsu, et al., "New Piezoelectric Transformer Converter for AC–adapter", IEEE APEC97 (Applied Power Electronics Conference, 97), pp. 568–572.

* cited by examiner

Primary Examiner—Bao Q. Vu
(74) Attorney, Agent, or Firm—McGinn & Gibb, PLLC

(57) ABSTRACT

A DC/DC converter is provided that includes a switch device for converting a DC voltage into an AC voltage, a piezoelectric transformer for changing the AC voltage and a current doubler type rectification-smoothing device, which includes a first diode, a second diode, a first inductor, a second inductor, and a capacitor. The piezoelectric transformer has one output terminal connected to a cathode of the first diode and to one terminal of the first inductor, and the other output terminal connected to a cathode of the second diode and to one terminal of the second inductor. Anodes of the first and the second diodes are respectively grounded. The other terminal of the first inductor is connected at a predetermined connection point to the other terminal of the second inductor. The connection point is connected to one terminal of the capacitor, whose other terminal is grounded.

6 Claims, 11 Drawing Sheets

DC/DC CONVERTER HAVING A PIEZOELECTRIC TRANSFORMER AND RECTIFICATION-SMOOTHING CIRCUIT

BACKGROUND OF THE INVENTION

1. Field of the Invention

The present invention relates to a DC/DC converter and in particular, to a high-efficiency DC/DC converter using a piezoelectric transformer.

2. Description of the Related Art

Conventionally, this type of technology used four-diode bridge rectification for rectification of a piezoelectric transformer of two-terminal output as a first conventional example described in "New Piezoelectric Transformer Converter for AC-adapter," IEEE APEC97 (Applied Power Electronics Conference 97), pp. 568–572, FIG. 4 [A]. By using the bridge rectification, both of a positive half cycle and a negative half cycle can supply power to the load.

In the aforementioned FIG. 4 of document [A], if the diode voltage drop in the forward direction is $V_F$, the diode forward direction voltage drop is $2 V_F$ because two diodes are connected in series in each cycle.

On the other hand, as a second conventional example, JP Patent, Publication of Unexamined Application A-7-59338 [B] suggests a piezoelectric transformer having a three-terminal output configuration in which a piezoelectric transformer output block (secondary side) has an intermediate tap for taking out an intermediate voltage so that the rectifier forward voltage drop is $V_F$. When such an intermediate tap is provided, as shown in FIG. 1 of document [B], it is possible to easily constitute a rectifier circuit having a diode forward voltage drop of $V_F$. Moreover, a power source circuit having a current doubler (Double Ended Converter using Two Inductors) is disclosed in US Pat. No. 4,899,271, Specification [C] and JP Patent, Publication of Examined Application B-61-24913 (power source circuit) [D]. Furthermore, JP Patent, Publication of Unexamined Application A-5-284734 discloses a switching power source with a reduced loss in a rectification element, enabling to obtain an improved power conversion efficiency.

However, the aforementioned prior arts have various problems as follows.

The first problem is that in the aforementioned first conventional example, i.e., the piezoelectric transformer of two-terminal output as described in document [A], rectification is carried out by a bridge rectification circuit and accordingly a diode forward voltage drop of $2 V_F$ is caused. If the output voltage is as low as 10 V, a loss is significantly remarkable, lowering the efficiency.

The second problem is that the aforementioned second conventional example, i.e., the piezoelectric transformer having a center tap as disclosed in document [B] requires a production process of a high accuracy for providing the center tap. That is, it is not easy to produce such a configuration and a production cost is increased.

SUMMARY OF THE INVENTION

It is therefore an object of the present invention to provide a novel DC/DC converter using a two-terminal piezoelectric transformer of reasonable cost and capable of reducing a rectification circuit loss and enhancing the power conversion efficiency.

In order to achieve the aforementioned object, in the DC/DC converter using a piezoelectric transformer, the rectification-smoothing circuit is realized as a rectification-smoothing circuit using a current doubler.

Furthermore, in the DC/DC converter using a piezoelectric transformer according to the present invention, in order to reduce the loss of the rectification circuit, the diode rectification is replaced by a synchronous rectification. Here, in order to assure drive of the rectification FET (field effect transistor), a gate waveform rectification circuit is used for clamping a piezoelectric transformer output voltage as a sinusoidal wave so as to maintain a constant gate voltage.

According to the present invention, by using a two-terminal output type piezoelectric transformer in combination with a current doubler rectification-smoothing circuit, it is possible to make the diode forward voltage drop VF and to reduce the loss compared to the bridge rectification.

If a synchronous rectification FET is used instead of a diode in the current doubler rectification-smoothing circuit, in a range $V_F$>Io·Ron (wherein Io is an output current, and Ron is a FET 'ON' resistance), the synchronous rectification FET can reduce the loss more than the diode.

Here, in the present invention, for driving the synchronous rectification FET, a technique is devised to fully utilize a switching power source using a piezoelectric transformer. That is, the piezoelectric transformer has a strong resonance characteristic and accordingly, for any input waveforms (for example, square waveform, triangle waveform, or sinusoidal waveform), the piezoelectric transformer output voltage has a sinusoidal waveform. Consequently, if the piezoelectric transformer output voltage is directly used as a synchronous rectification FET gate signal, the output sinusoidal wave voltage has a peak value exceeding an absolute maximum rating (usually, 20 V) of the synchronous rectification FET gate, which may destroy the synchronous rectification FET. On the contrary, if the piezoelectric transformer output sinusoidal wave voltage has a peak value set to a sufficiently low value not to exceed the gate absolute maximum rating, it becomes impossible to obtain a sufficiently long period of time for exceeding the gate 'ON' voltage threshold value V TH and accordingly, the synchronous rectification FET cannot be in 'ON' state for a sufficiently long period of time.

A solution to this problem is clamping with an appropriate value (such as 10 V) the piezoelectric transformer output sinusoidal wave voltage having a sufficiently great peak value. This can be realized by using a gate waveform rectification circuit.

This enables to overcome the defect that the piezoelectric transformer output voltage is a sinusoidal wave and effectively operate the current doubler rectification-smoothing circuit of synchronous rectification type.

DESCRIPTION OF THE PREFERRED EMBODIMENTS

Description will now be directed to preferred embodiments of the present invention with reference to the attached drawings.

Figure 1:
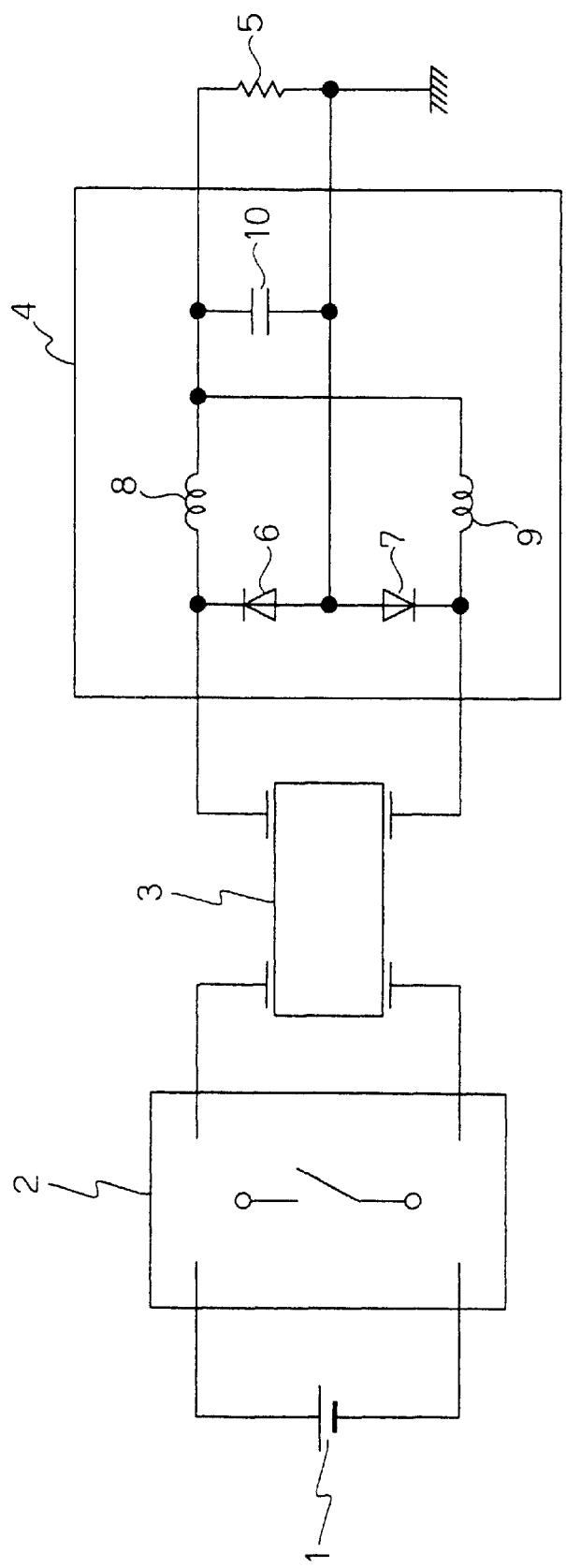
FIG. 1 is a block diagram showing a basic circuit configuration according to the present invention.

FIG. 1 is a block diagram showing a representative circuit configuration according to the present invention.

Figure 2:
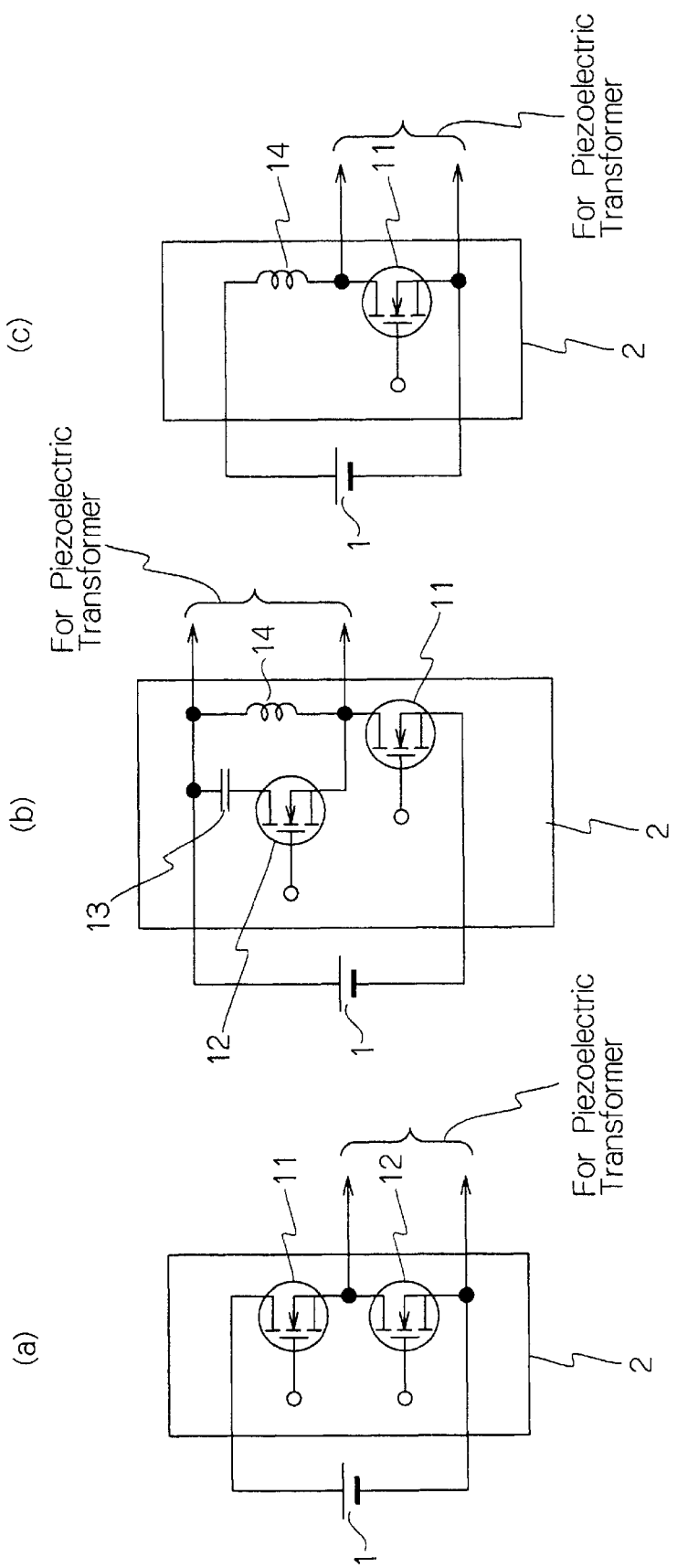
FIG. 2A, FIG. 2B, and FIG. 2C are block diagrams showing variations of a switching circuit used in the present invention.

Referring to FIG. 1, the circuit according to the present invention basically includes a DC input power source 1, a switching circuit 2, a piezoelectric transformer 3, a current doubler rectification-smoothing circuit 4, and a load resistor 5. The switching circuit 2 may be a half-bridge type shown in FIG. 2A, an active clamp type shown in FIG. 2B, an E class resonance type, or any other type.

[First Embodiment]

Figure 3:
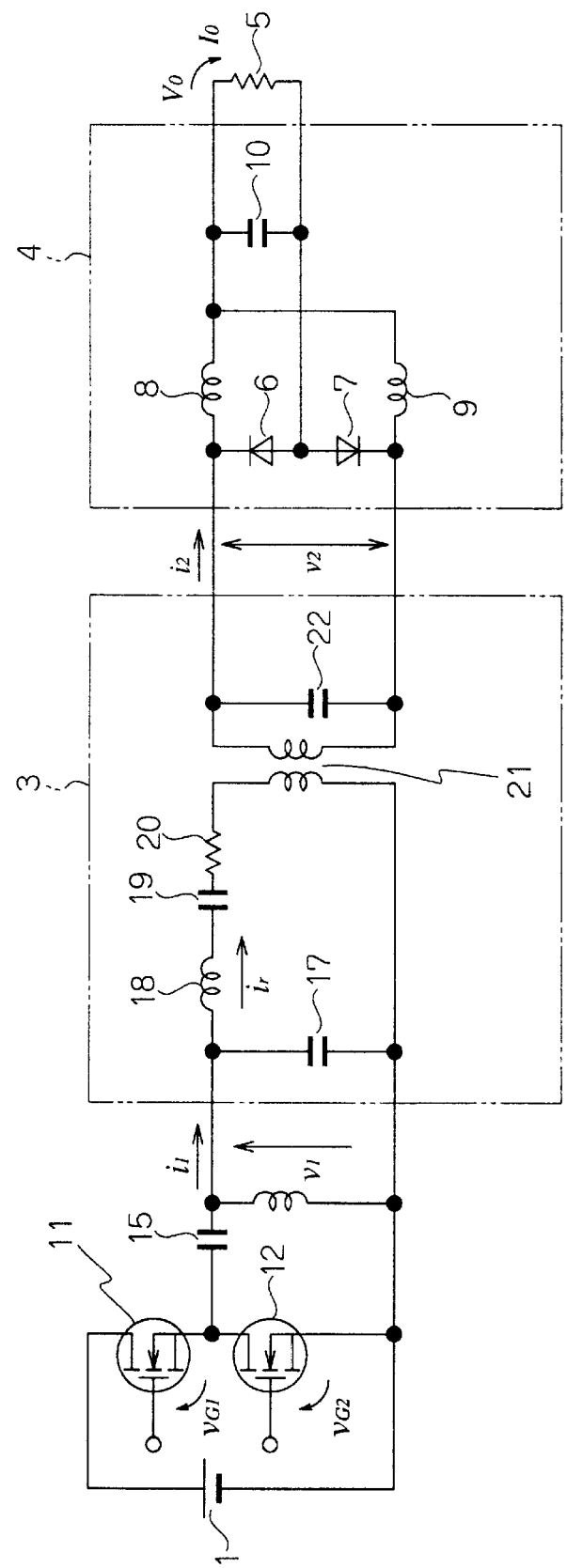
FIG. 3 is a block diagram showing a circuit configuration according to a first embodiment of the present invention.

FIG. 3 shows a specific example of the circuit configuration of FIG. 1 according to the first embodiment. The piezoelectric transformer 3 is represented by an equivalent circuit, and the switching circuit is realized as the half-bridge type shown in FIG. 2A as a representative circuit. Moreover, in order to reduce a charge/discharge loss in an input capacitor 17 of the piezoelectric transformer 3, a charge/discharge inductor 16 and a DC bias cut capacitor 15 are added to the half-bridge type switching circuit.

Next, referring to the waveforms shown FIG. 4, explanation will be given on the operation of this first embodiment.

Figure 4:
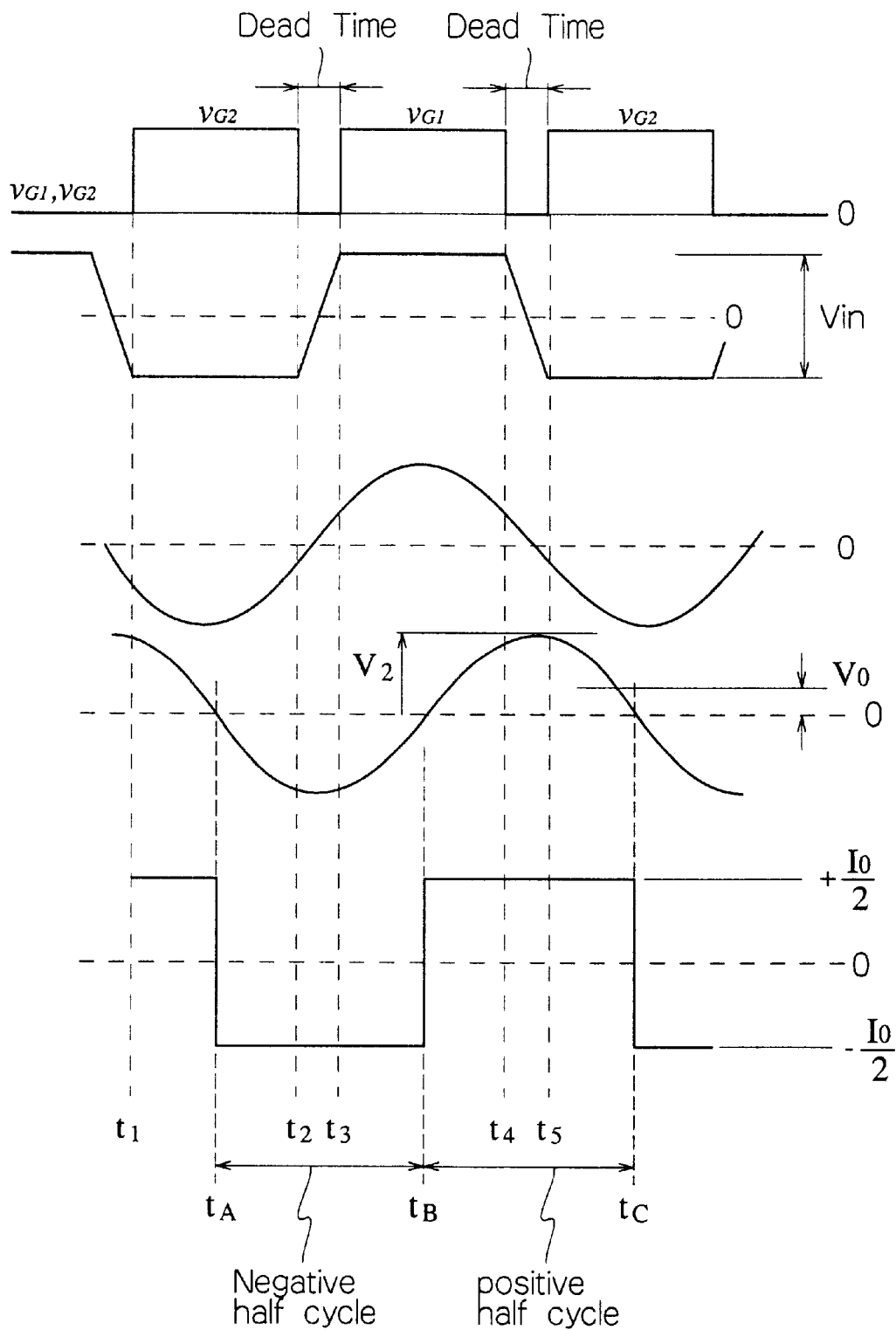
FIG. 4 is a timing chart showing waveforms involved in the circuit according to the first embodiment shown in FIG. 3.

Referring to FIG. 3 and FIG. 4, the switching circuit 2 has switches 11 and 12 which are driven by gate voltage vG1 and vG2 having a dead time so as to be alternately turned ON and OFF.

During this dead time period, the input capacitor 17 of the piezoelectric transformer 3 is charged and discharged by an inductor current flowing through an inductor 16. Consequently, the piezoelectric transformer 3 has an input voltage waveform $v_1$ which is a quasi-square waveform as shown in FIG. 4. This input voltage $v_1$ is applied to the piezoelectric transformer 3 having a strong band-pass filter characteristic and accordingly, a sinusoidal wave ir flows inside the piezoelectric transformer 3 so that the piezoelectric transformer 3 has an output voltage waveform which is a sinusoidal wave $v_2$. The piezoelectric transformer output voltage $v_2$ is half-wave rectified by the current doubler rectification-smoothing circuit 1 and the output voltage $V_0$ can be expressed as follows:

$$V_0 = \frac{V_2}{\pi}$$

wherein $V_2$ is an amplitude of $v_2$.

An output current $i_2$ from the piezoelectric transformer 3 flows with an amplitude of $\pm I_0/2$, wherein $I_0$ represents an output current flowing through a load resistor 5.

Figure 5:
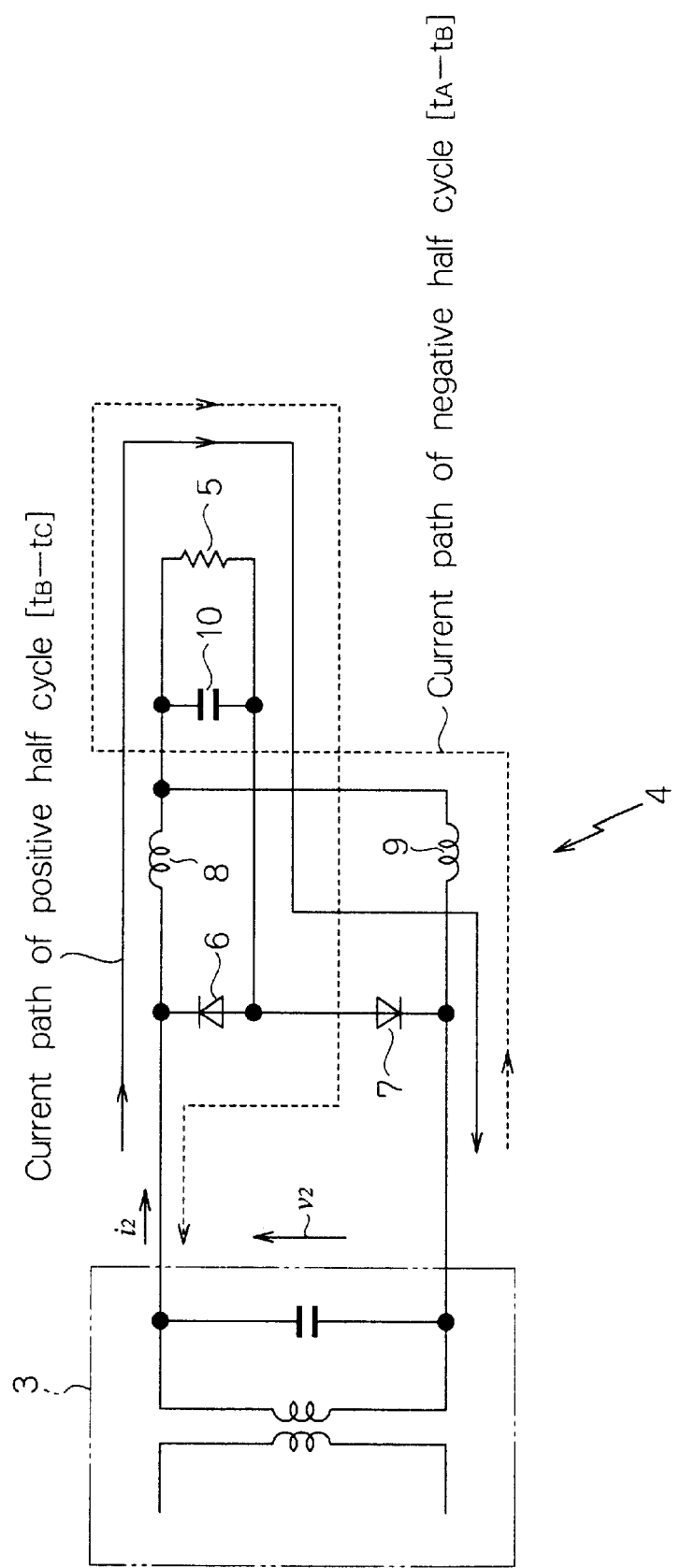
FIG. 5 is a block diagram for explanation of operation of a current doubler rectification-smoothing circuit.

Here, referring to FIG. 5, explanation will be given on the current doubler rectification-smoothing circuit 4. Firstly, a definition is made as follows. In the respective waveforms of FIG. 4, an interval [tB–tC] having an output $v_2$ of the piezoelectric transformer 3 as a positive voltage is a positive half cycle, and an interval [tA–tB] having an output voltage $v_2$ as a negative voltage is a negative half cycle.

During the positive half cycle [tB–tC], the diode 6 is 'OFF'. The output current i2 from the piezoelectric transformer 3 flows through the inductor 8 and the diode 7 and supplies a power to the load resistor 5.

Here, in the inductor 8, half of the load current, i.e., $+I_0/2$ is flowing. Simultaneously with this, another $+I_0/2$ current flows to the inductor 9 via the diode 7 and the load resistor 5 as a circulating current like a free wheel. This current of the inductor 8 is added to the current of the inductor 9 to make a load current I0.

Each of the currents flowing to the inductors 8 and 9 is overlaid with a ripple current which is determined by an inductance. However, the ripple currents are cancelled because of having a reversed phase to each other, and almost no ripple current flows into the output capacitor 10.

In an ordinary current doubler, where the time ratio of the positive and negative half cycles may not be equal to each other, it is impossible to completely cancel such ripple currents. That is, as ripple currents flow into the capacitor 10, the capacitor 10 need to have a sufficiently great capacitance. In the piezoelectric transformer in combination with a current doubler according to the present invention, the output of the piezoelectric transformer is always a sinusoidal wave and the time ratio of the positive and the negative half cycles are always identical.

Consequently, ripple currents flowing into the inductors 8 and 9 can always be cancelled completely and accordingly, the output capacitor 10 may have a small capacitance. Because it is possible to make the inductance of the inductors 8 and 9 small, this can contribute to reduction of the entire converter apparatus.

In the negative half cycle [tA–tB], the diode 7 is OFF. The output current i2 flows through the inductor 9 and the diode 6 for supplying a power to the load resistor 5. The operation involved here is identical to the operation explained in the aforementioned positive half cycle.

[Second Embodiment]

Figure 6:
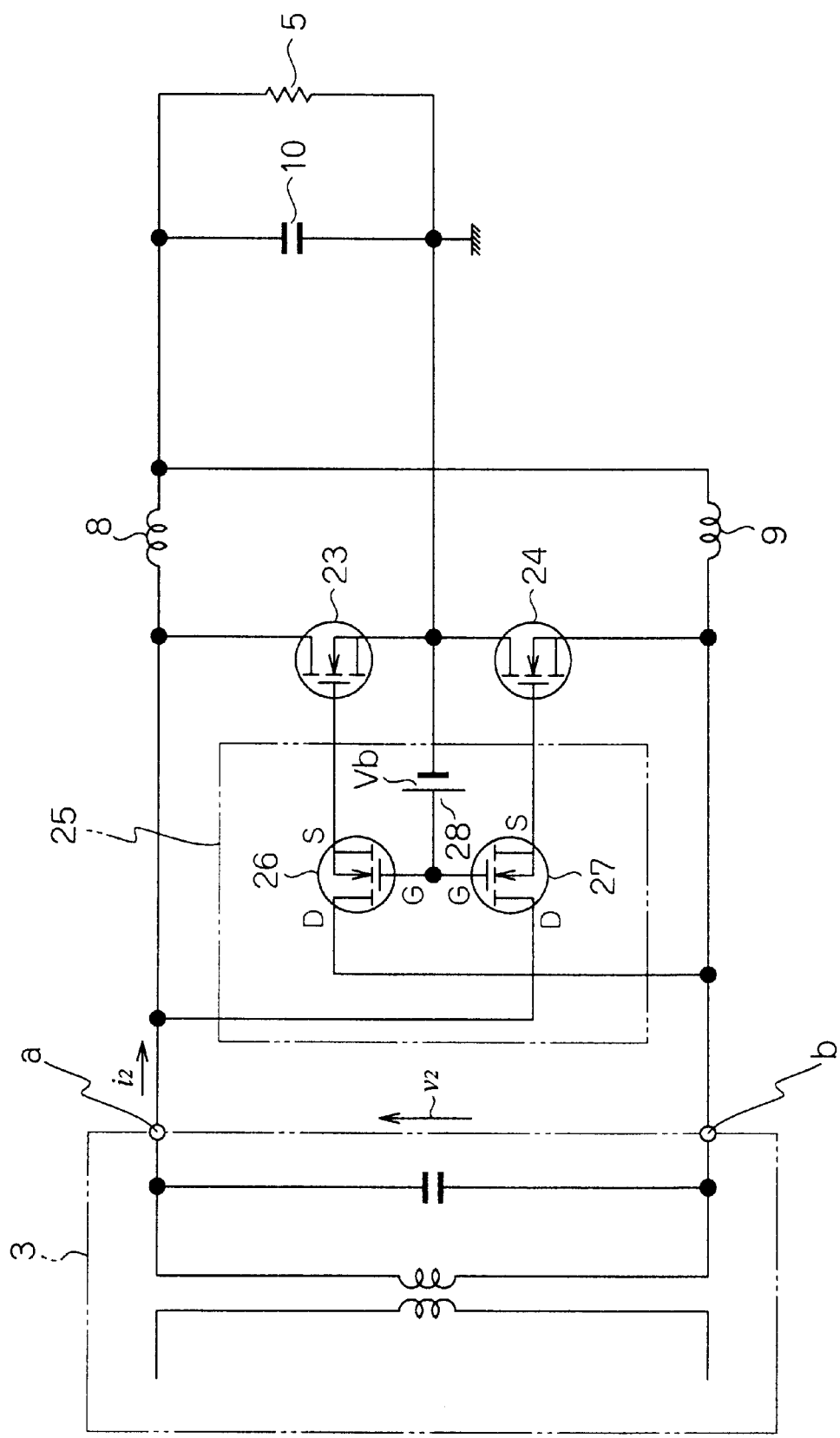
FIG. 6 is a block diagram showing a circuit configuration of a piezoelectric transformer DC/DC converter using a current doubler rectification-smoothing circuit of synchronous rectification type according to a second embodiment of the present invention.

Description will now be directed to a second embodiment of the present invention in which a synchronous rectifier is used instead of the diode in the current doubler rectification-smoothing circuit with reference to FIG. 6.

FIG. 6 is a block diagram showing a circuit configuration according to the second embodiment.

Referring to FIG. 6, the input side to the piezoelectric transformer 3 is identical as in FIG. 3 and it is omitted in this FIG. 6.

In this second embodiment, the aforementioned diodes 6 and 7 in the first embodiment are respectively replaced by a synchronous rectification FET 23 and a synchronous rectification FET 24. The FET 23 has a gate terminal connected via a waveform rectification circuit 25 to an output terminal 'a' of the piezoelectric transformer 3. The FET 24 has a gate terminal connected via the waveform rectification circuit 25 to an output terminal 'b' of the piezoelectric transformer 3.

Next, explanation will be given on a configuration of the aforementioned rectification circuit 25.

The synchronous rectification FET 23 has a gate terminal connected to a source of a clamp FET 26. The FET 26 has a drain connected to the output terminal 'b' of the piezoelectric transformer 3, and a gate terminal connected to a clamp voltage source 28. Similarly, the synchronous rectification FET 24 has a gate terminal connected to a source of the clamp FET 27, whose drain is connected to the output terminal 'a' of the piezoelectric transformer 3 and whose gate is connected to the clamp voltage source 28.

Figure 7:
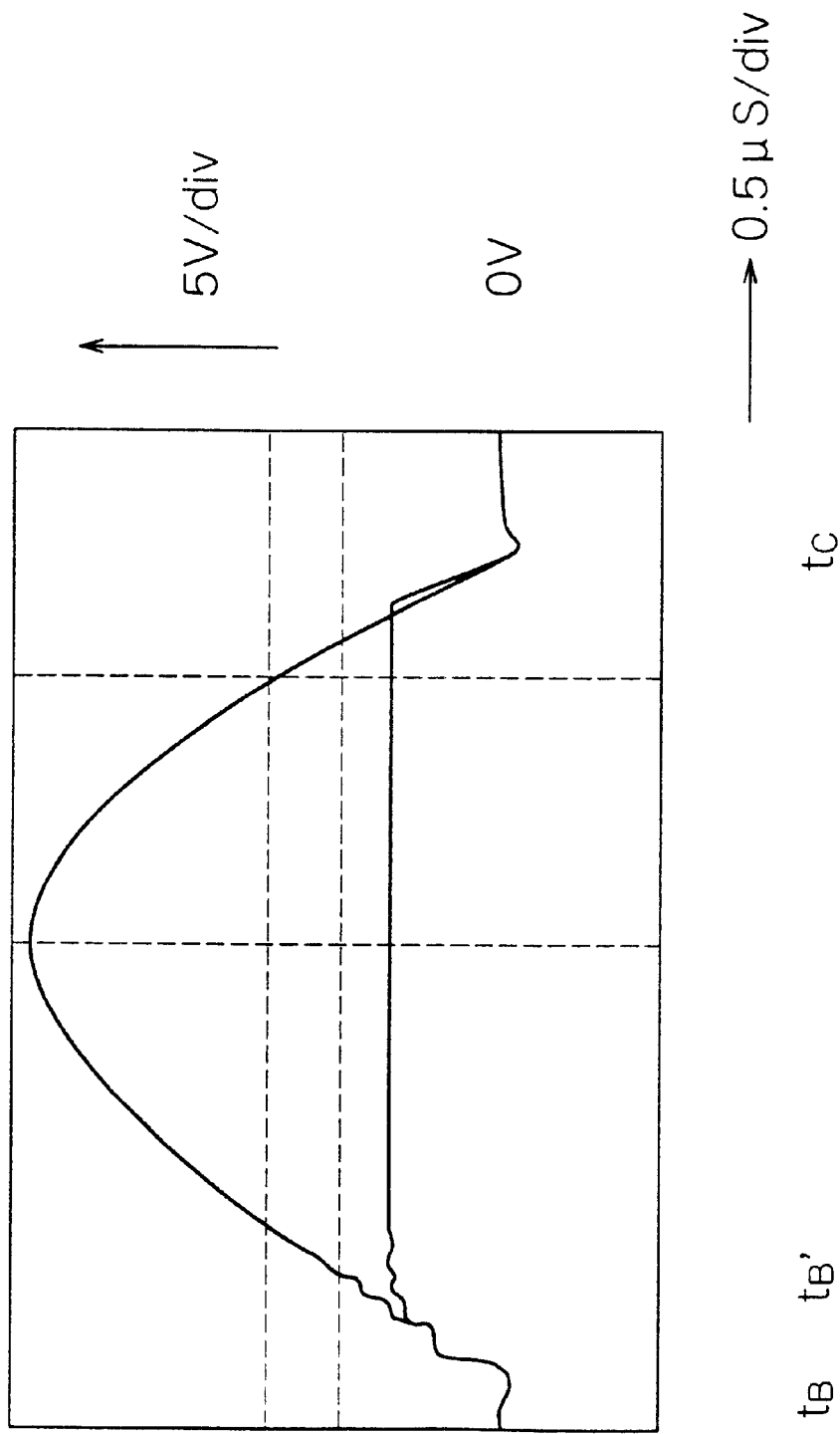
FIG. 7 shows a gate waveform (observed) of FET for synchronous rectification.

Here, explanation will be given on the operation of the waveform rectification circuit 25 with reference to FIG. 7.

Firstly, explanation will be given on the positive half cycle. Referring to FIG. 6 and FIG. 7, at time tB (same as time tB in FIG. 4), the output voltage v2 of the piezoelectric transformer 3 becomes positive. The clamp FET 27 has been turned ON by the clamp voltage Vb of the clamp voltage source 28 applied to the gate. Accordingly, the FET 27 has a source voltage $v_3$ which is also positive and equal to the output voltage $v_2$. Here, at time tB' when the output voltage $v_2$ becomes greater than the clamp voltage Vb, the FET 27 is turned OFF and the source voltage $v_3$ becomes equal to the clamp voltage Vb as a constant voltage. Here, the clamp voltage Vb is set to an appropriate value in the order of 10 V. The negative half cycle operates identically.

Figure 8:
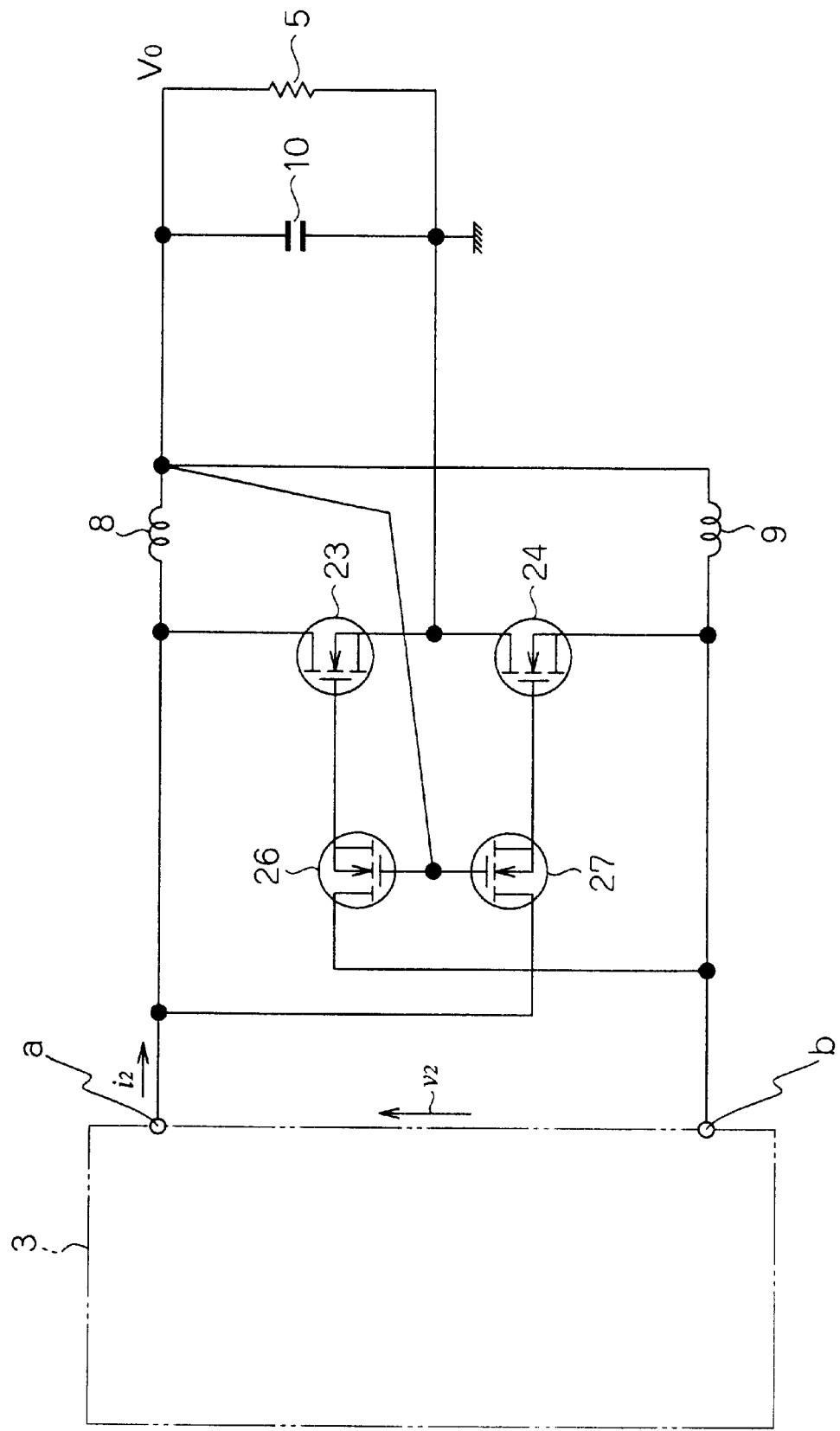
FIG. 8 is a block diagram showing an essential portion of a first modification of the second embodiment.
Figure 9:
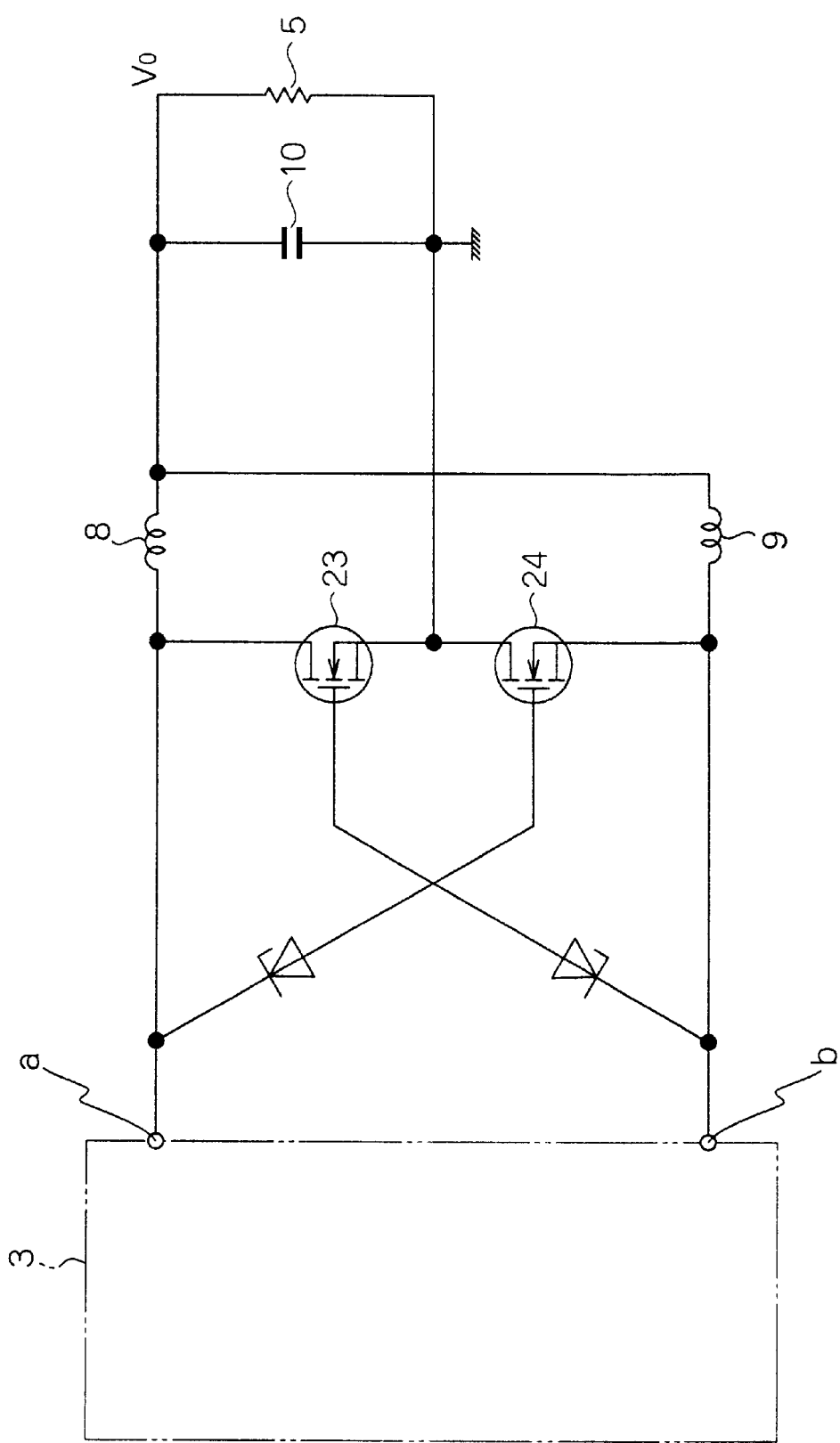
FIG. 9 is a block diagram showing an essential portion of a second modification of the second embodiment.
Figure 10:
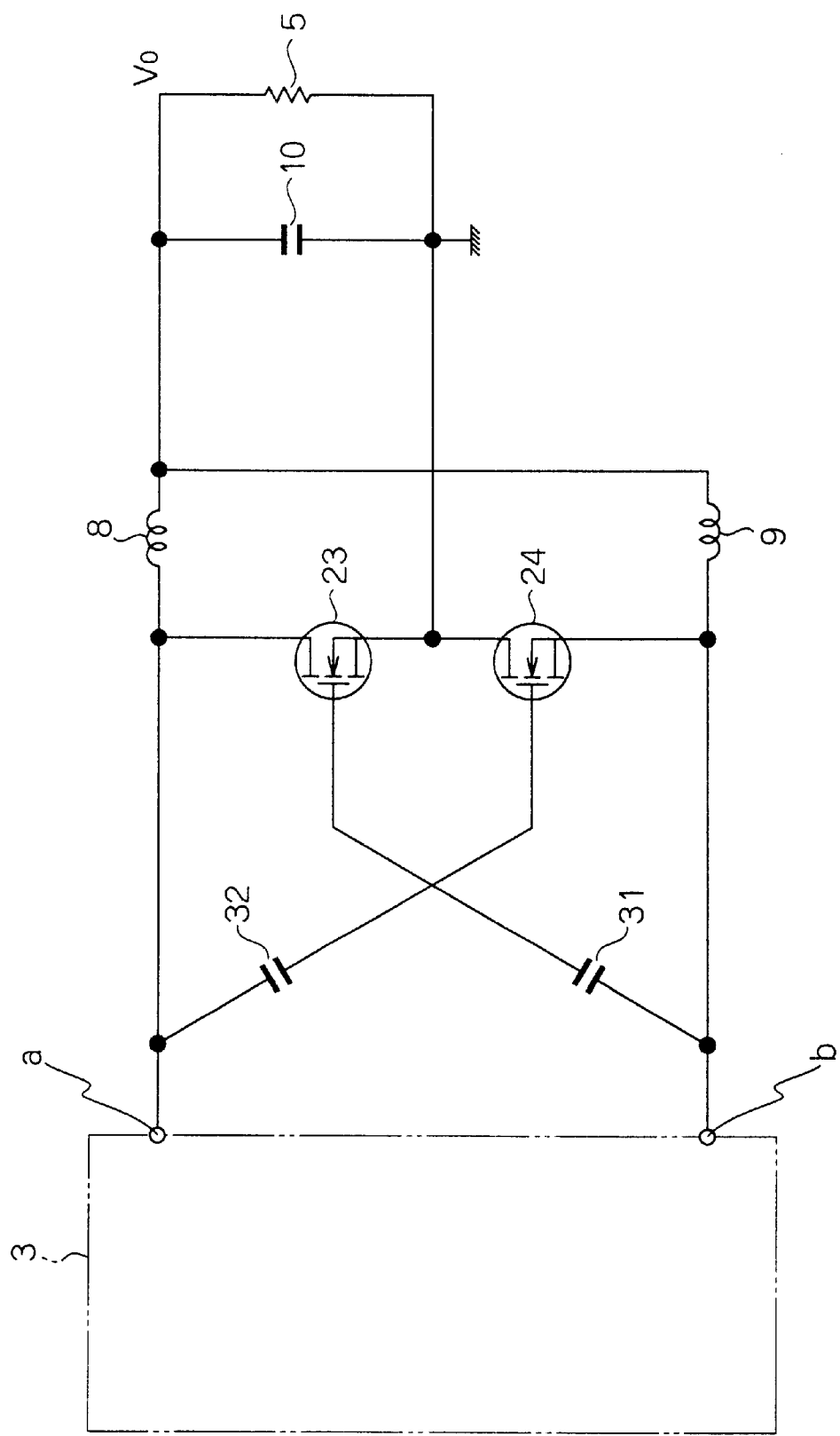
FIG. 10 is a block diagram showing an essential portion of a third modification of the second embodiment.

Next, FIG. 8, FIG. 9, and FIG. 10 show modifications of the synchronous rectification type current doubler rectification-smoothing circuit according to the second embodiment. In the modified example shown in FIG. 8, the clamp voltage source 28 is removed and the clamp voltage Vb is supplied from the output voltage of the converter.

The circuit configuration of FIG. 8 differs from the circuit configuration of FIG. 9 in that the clamp voltage source 28 is removed and that instead of using the voltage Vb, the gate terminals of FET 26 and FET 27 are connected to the output of the DC/DC converter. Thus, it is possible to reduce the number of components constituting the circuit.

In the circuit FIG. 9, the synchronous rectification FET 23 has a gate terminal connected via a zener diode 29 to the output terminal 'a' of the piezoelectric transformer 3, and the synchronous rectification FET 24 has a gate terminal connected via a zener diode 30 to the output terminal 'a' of the piezoelectric transformer 3.

The circuit of FIG. 9 differs from the circuit of FIG. 6 and FIG. 8 in that the FET 26 and FET 27 are replaced by zener diodes 29 and 30. That is, it is possible to reduce a production cost of the entire configuration.

In the circuit configuration of FIG. 10, the synchronous rectification FET 2 has a gate terminal connected via a bias cut capacitor 31 to the output terminal 'b' of the piezoelectric transformer 3, and the synchronous rectification FET 24 has a gate terminal connected via a bias cut capacitor 32 to the output terminal 'a' of the piezoelectric transformer 3.

The circuit configuration of FIG. 10 differs from that of FIG. 6 and FIG. 8 in that the FETs are replaced by the capacitors. Accordingly, in the same way as the aforementioned modification of FIG. 9, it is possible to reduce the production cost of the entire circuit.

[Third Embodiment]

Figure 11:
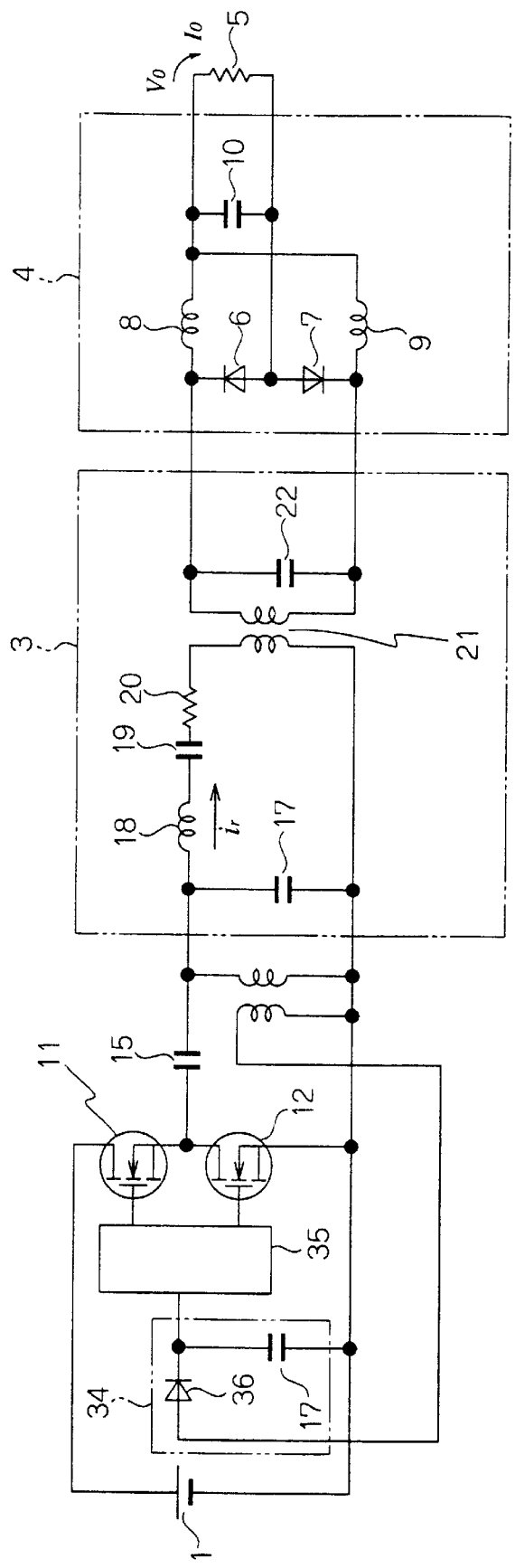
FIG. 11 is a block diagram showing a circuit configuration according to a third embodiment of the present invention.

FIG. 11 shows a circuit configuration according to the third embodiment of the present invention.

As shown in FIG. 11, a second winding is provided to the resonance inductor 16 of FIG. 3 so as to constitute a resonance inductor 33, so that an AC voltage induced by this second winding is converted into a DC voltage by the rectification-smoothing circuit 34 for use as a power voltage of the control IC 35.

The DC/DC converters according to the first, the second, and the third embodiments have been explained for DC power source as an input, but can also be applied directly to a so-called AC input power source in which an AC input (such as 100 VAC/50 Hz) is rectified-smoothed into a DC voltage.

The present invention has various effects as follows.

As a first effect, by using a current doubler rectification-smoothing circuit instead of a bridge rectification, it is possible to increase the efficiency of the DC\DC converter using a two-terminal output type piezoelectric transformer. More specifically, with an output of 10 VDC/1 A, the efficiency was increased by 5% from 75% to 80%.

The reason is that the forward direction voltage drop of the rectification diode is reduced to half.

As a second effect, by using a synchronous rectification instead of a diode in the current doubler rectification-smoothing circuit, it is possible to further increase the efficiency. More specifically, with an output of 10 VDC/1 A, the efficiency was increased by 5% from 80% to 85%.

The reason is that the piezoelectric transformer output sinusoidal wave voltage is introduced into a special waveform rectification which enables to assure drive of the synchronous rectification FET.

The invention may be embodied in other specific forms without departing from the spirit or essential characteristic thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 09-205719 (filed on Jul. $31^{st,}$ 1997) including specification, claims, drawings and summary are incorporated herein by reference in its entirety.

What is claimed is:

1. A DC/DC converter comprising:
   a switch for converting a DC voltage into an AC voltage;
   a piezoelectric transformer for changing said AC voltage from an input waveform with any duty into an output sinusoidal waveform with a 50% duty in which a time ratio of positive and negative half cycles are identical; and
   a current doubler (Double Ended Converter using Two Inductors) type rectification-smoothing circuit that receives the output sinusoidal waveform from the piezoelectric transformer and outputs zero-ripple current,
   wherein said rectification-smoothing circuit includes a first FET (field effect transistor), a second FET, a first inductor, a second inductor, and a capacitor, so that
   said first FET has a gate terminal connected via a first waveform rectification circuit to one output terminal of said piezoelectric transformer,
   said second FET has a gate terminal connected via a second waveform rectification circuit to the other output terminal of said piezoelectric transformer, and
   rectification is carried out by using said first FET and said second FET.

2. A DC/DC converter as claimed in claim 1, wherein
   said piezoelectric transformer has one output terminal connected to a drain of said first FET and to one terminal of said first inductor, and said piezoelectric transformer has the other output terminal connected to a drain of said second FET and one terminal of said second inductor;
   a source of said first FET and a source of said second FET are grounded, and the other terminal of said first inductor is connected to the other terminal of said second inductor at a predetermined connection point; and said connection point is connected to one terminal of said capacitor, whose other terminal is grounded.

3. A DC/DC converter as claimed in claim 1, wherein said first waveform rectification circuit has a third FET and said second waveform rectification circuit has a fourth FET;

said third FET has: a source connected to a gate terminal of said first FET, a drain connected to one output terminal of said piezoelectric transformer, and a gate terminal connected to a predetermined bias power source; and said fourth FET has: a source connected to a gate terminal of said second FET, a drain connected to the other output terminal of said piezoelectric transformer, and a gate terminal connected to said bias power source.

4. A DC/DC converter as claimed in claim 1, wherein said first waveform rectification circuit includes a third FET and said second waveform rectification circuit includes a fourth FET;

said third FET has: a source connected to a gate terminal of said first FET, a drain connected to one output terminal of said piezoelectric transformer, and a gate terminal connected to an output terminal of said DC/DC converter; and said fourth FET has: a source connected to a gate terminal of said second FET, a drain connected to the other output terminal of said piezoelectric transformer, and a gate terminal connected to an output terminal of said DC/DC converter.

5. A DC/DC converter as claimed in claim 1, wherein said rectification-smoothing circuit includes a first zener diode, a second zener diode, a first inductor, a second inductor, and a capacitor;

said first zener diode has a gate terminal connected via a first waveform rectification circuit to one output terminal of said piezoelectric transformer; and said second zener diode has a gate terminal connected via a second waveform rectification circuit to the other output terminal of said piezoelectric transformer;

so that rectification is carried out by using said first zener diode and said second zener diode.

6. A DC/DC converter as claimed in claim 1, wherein said rectification-smoothing circuit includes a first capacitor, a second capacitor, a third capacitor, a first inductor, and a second inductor;

said first capacitor has a gate terminal connected via a first waveform rectification circuit to one output terminal of said piezoelectric transformer; and said second capacitor has a gate terminal connected via a second waveform rectification circuit to the other output terminal of said piezoelectric transformer;

so that rectification is carried out by using said first capacitor and said second capacitor.

* * * * *

UNITED STATES PATENT AND TRADEMARK OFFICE
CERTIFICATE OF CORRECTION

PATENT NO. : 6,535,407 B1
APPLICATION NO. : 09/123522
DATED : March 18, 2003
INVENTOR(S) : Toshiyuki Zaitsu It is certified that error appears in the above-identified patent and that said Letters Patent is hereby corrected as shown below:

On the title page Item (56) References Cited,

Please correct FOREIGN PATENT DOCUMENTS to add:

JP 56-133289 August 27, 1981.

Signed and Sealed this

Twelfth Day of September, 2006

JON W. DUDAS
*Director of the United States Patent and Trademark Office*